United States Patent Office 3,061,474
Patented Oct. 30, 1962

3,061,474
PROCESS FOR TREATING CELLULOSIC FABRIC, COMPOSITION THEREFOR AND FABRIC RESULTING THEREFROM
Frederick T. Lense, Greenville, S.C., assignor to Esso Research and Engineering Company, a corporation of Delaware
No Drawing. Filed May 25, 1959, Ser. No. 815,317
12 Claims. (Cl. 117—143)

This invention relates to the use of high molecular weight, branched chain alcohols in the resin treatment of fabrics.

In particular, the invention relates to the use of $C_{13}$ to $C_{32}$, particularly $C_{16}$ to $C_{26}$, and preferably $C_{16}$ to $C_{20}$, branched chain, monohydric, primary alcohols with thermosetting resins in the treatment of textile fabrics prepared from fibers having a porous surface such as possessed by rayon, cotton, silk and bast fibers.

More particularly, the invention relates to the incorporation of such alcohols in thermosetting resin formulations for treating cotton fabrics to improve their hand and to reduce the impairment in their physical properties caused by such resins.

Fabrics derived from cellulosic fibers, and particularly the important fabrics of cotton and rayon, unless modified tend to crush and wrinkle easily and to shrink during laundering. In order to render cotton and other cellulosic fibers satisfactory for use in certain fabrics such as the so-called "wash and wear" garments, it is necessary to modify the intrinsic properties of the fiber both chemically and physically to provide the cloth with crush and/or crease resistance which may be durable to washing. This modification may be effected by treating such fibers with thermosetting resins or combinations of these resins with thermoplastic resins. In the past the resins most commonly used in textile finishing have been the urea and modified urea-formaldehyde resins, the melamine and modified melamine-formaldehyde resins and the alkyd resins. Cottons and rayons have been treated in the main by the former two. More recently improved resins such as the dimethylol ethylene urea resins have accounted for increasing amounts of fabric treating. Other resins which are used include various combinations of the aforesaid resins with polyvinyl alcohols, low polymer acrylate resins and with each other. The epoxy resins have found some use also.

Synthetic resins are complex organic products and are generally classified as either thermosetting, i.e. hardened into infusible masses by heat, or thermoplastic, i.e. reducible into plastic or workable masses by the application of heat.

Thermosetting resins after curing are tri-dimensional or highly crosslinked yielding a heat resistant end product. They are generally polymerized by condensation reactions with the elimination of water or other simple chemical. For the most part they are applied to fabrics not as fully polymerized condensates but as precursors which are polymerized and in other ways modified on the textile by curing. The textile mill normally receives them as monomers or low polymers. They are at this stage generally water soluble and require a catalyst plus heat, e.g. 280° to 350° F. to attain their final polymeric state. Acidic catalysts are generally used for this purpose. The acidic catalysts which are suitable include tartaric acid, oxalic acid, ammonium chloride, -sulfate, or -phosphate, organic amine salts and zinc or magnesium salts.

Thermosetting resins are generally applied to textiles by padding. The resin is dissolved in water to give a solution of the desired concentration and the catalyst is added just prior to use. The fabric is impregnated by passing it into the solution for one or more dips and then through a two or three-roll padder to squeeze the solution into the fibers and to remove excess surface liquid.

The concentration of the resin will vary depending on the nature of the treatment, the resin used, and the type of cloth being treated. Usually cotton fabrics require less resin than rayon. On cotton goods amounts in the range of about 4 to 8 weight percent resin are generally employed whereas with linen and filament rayons amounts in the range of 6 to 12 weight percent have been used.

The thermosetting resins conventionally used for fabric treating are discussed in detail both as to their composition and their effect on fabrics in chapter 19, "Textile Chemicals and Auxiliaries," 2nd ed. (1957), Reinhold Publishing Corporation, New York, New York.

The use of such resins also has certain adverse effects on the treated fabric. They impart to the fabric a stiff and sometimes undesirable hand. The fabrics become chlorine retentive and show loss in tensile and tear strength. To improve the hand a softener is commonly used. Many types of softeners now in resin formulations improve the hand but since they are not linked to the cellulosic material as the resin is they are removed on laundering. The softeners most commonly used in the past were the sulfated tallows or oils. More recently silicone emulsions have been used.

It has now been discovered that a $C_{13}$ to $C_{32}$, branched chain, monohydric, primary alcohol will provide a superior softener which when used in conjunction with a thermosetting resin or a thermosetting-thermoplastic resin combination will provide a durable textile impregnation treatment wherein the alcohol becomes an active ingredient of an alcohol-resin-fiber reaction system. Such a treatment will not only reduce the aforementioned adverse effects of the resin treatment, but by bonding the alcohol, the resin and the cellulosic fiber into a single system the durability of the treatment to repeated laundering is assured.

Suitable alcohols for use with this invention may be prepared by the Aldox process, a modification of the well-known Oxo process.

In the Aldox process, a primary alcohol product is prepared from an olefin and a synthesis gas of carbon monoxide and hydrogen. Except for the use of a reaction modifier hereinafter discussed and the product, the Aldox process is substantially the same as the Oxo process. In the Oxo process, oxygenated organic compounds are synthesized in the presence of a cobalt catalyst from organic compounds containing olefinic linkages by reaction with carbon monoxide and hydrogen. In this reaction predominantly aldehydes and minor proportions of ketones and alcohols are formed. The products from this Oxo step may then be hydrogenated in a second step to convert the organic carbonyl compounds containing one more carbon atom than the olefinic starting material to the corresponding alcohol. The hydrogenation catalyst may comprise any known reduction catalyst such as metallic supported or unsupported nickel, copper chromite, sulfactive catalyst such as oxides and sulfides of tungsten, nickel, molybdenum and the like.

Straight and branched chain olefins such as propylene, butylene, pentene, hexene, heptene, styrene, olefin polymers such as di and triisobutylene, hexene and heptene dimers, polypropylenes, olefinic fractions from the hydrocarbon synthesis process, thermal or catalytic cracking operations, and other sources of hydrocarbon fractions containing such olefins may be used as starting materials depending on the nature of the final product desired. The synthesis gas mixture fed to the first stage may be any desired ratio of $H_2$ to CO, preferably within the limit of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general, about 2500 to 25,000 cubic feet of $H_2$+CO per barrel of olefin feed are employed.

The catalyst for the first stage of the process may be employed in the form of an oil-soluble compound of the catalytically active carbonylation metal. Thus, there have been employed the salts of the metals such as cobalt and high molecular weight fatty acid such as stearic, oleic, naphthenic, linoleic and the like. Water-soluble catalyst, such as cobalt acetate, chloride, and the like, may also be used. Catalyst concentrations may vary from about 0.05 to 1.0% by weight of the catalyst calculated as cobalt on olefinic feed. The first stage for carbonylation reaction may be carried out at temperatures in the range of from about 250° to 450° F. depending upon the nature of the olefin and other reaction conditions. In general, the lower olefins will react at lower temperatures and will react to a greater extent than the higher molecular weight olefins.

The Oxo process without modification will produce some alcohols of higher molecular weight, but the yields of such products are relatively low. These alcohols result from several different mechanisms including adolization, dehydration, dimerization, acetalization, etc. Some of these alcohols contain two more than twice the number of carbons in the olefin feed and are highly branched alkanols. Another type contains three more than twice the number of carbons in the olefin feed but this latter type also contains an additional oxygen atom in the molecule forming an ether linkage with two internal carbon atoms.

For a more accurate description of these ether alcohols see Oxo Ether Alcohols, Bartlett et al., Industrial and Engineering Chemistry, March 1959, pages 257-258.

In the Aldox process the same reactors, catalyst, and reaction conditions may be employed as in the aforedescribed Oxo process, and in addition, a reaction modifier is employed which results in the production, in high yields, of a primary alcohol product having $2n+2$ carbon atoms, where an olefin with $n$ carbon atoms is passed to the carbonylation zone. Accompanying this reaction is the normal aldehyde reaction producing aldehydes and alcohols having $n+1$ carbon atoms.

The aforesaid reaction modifiers are preferably zinc compounds. The zinc compounds suitable are salts or fatty acids, oxides, hydroxides, carbonates, and also metallic salts of cobalt hydrocarbonyl. Thus, in the Aldox process there is passed into the first-stage reaction zone along with the olefin, carbon monoxide, hydrogen, and cobalt carbonylation catalyst, a reaction modifier, preferably zinc. Other Aldox modifiers have been suggested in the prior art. The mono-ether, mono-hydroxy alcohols hereinbefore described may also be produced in the Aldox process in somewhat lesser quantities. The $C_{13}$ to $C_{32}$ alcohols of this group may also be used in this invention.

A liquid oxygenated reaction product comprising aldehydes from the carbonylation reaction containing inorganic contaminants, e.g. dissolved cobalt carbonyl and zinc salts, is sent to a catalyst decomposition or decobalting zone, where in the presence of heat and steam, water, or dilute organic acid, the inorganic contaminants are removed from the aldehyde product in a manner known in the art. The product, now substantially completely free of inorganic compounds, is hydrogentated under conventional conditions to alcohols and the alcohol product fractionated to produce both the $n+1$ and $2n+2$ alcohols, as described.

The production of such alcohols by the Aldox process is covered by U.S. Patent 2,811,567. Thus, the Aldox process and the branched chain liquid alcohols produced therein are well known to the art.

Monohydric, primary alcohols may also be prepared from aldehydes via conventional Aldol condensation. By this process the positive end of a carbonyl group is linked with a carbanion by a typical "Aldol condensation" known to the art. The primary Aldol product may then be dehydrated by means known to the art to yield an unsaturated aldehyde which can be hydrogenated to a primary alcohol.

Another method for preparing monohydric, primary alcohols is by the process known to the art as the Guerbet reaction.

The alcohol may be applied separately prior to the application of the resin. Preferably, however, it is added to the resin bath. When the alcohol is applied prior to the resin treatment it may be applied undiluted but the preferred form of application is an alcohol-water emulsion. Where the alcohol is added to the resin bath it may be added as an alcohol-water emulsion, as a combination of alcohol and emulsifying agent, or the alcohol may be added to a resin bath which contains an emulsifying agent. Thus, where the alcohol is added to the resin bath an emulsion is formed comprising in combination 10 to 85 wt. percent of a thermosetting resin, 10 to 85 wt. percent water, 1 to 25 wt. percent of a $C_{13}$ to $C_{32}$ branched chain, monohydric, primary alcohol and 1 to 10 wt. percent of an emulsifying agent.

Pursuant to this invention the alcohol should be used in amounts to deposit from about 0.5 to 4, preferably about 1 to 2.5% by weight of the alcohol on the fabric treated based on the weight of such fabric. Thus, the weight ratio of alcohol to resin solids may be in the range of about 1:20 to 1:2, preferably about 1:8 to 1:4.

The emulsifying agent may be cationic, anionic or nonionic. The nonionic emulsifiers having an organic hydrophobic group and an alkylene oxide hydrophilic group are preferred. One group of these that are particularly suitable for use with this invention are those wherein the hydrophobic portion of the molecule is an alkyl, aryl or alkaryl hydrocarbon group or a substituted alkyl, aryl, or alkaryl hydrocarbon group, e.g. ethers and alcohols, containing 12 to 60, preferably 20 to 36, carbon atoms and the hydrophilic group comprises an ethylene oxide condensate which comprises 20 to 95, preferably 50 to 95 weight percent of the molecule. Among the many commercially available emulsifiers which may be used are those sold under the trade names of Triton, Sterox, and Igepal.

The term "branched chain, monohydric, primary alcohol" as used herein shall be construed to include both monohydric, primary alcohols which aside from the hydroxyl group are composed exclusively of carbon and hydrogen atoms and monohydric, primary alcohols which aside from the hydroxyl group are composed of carbon atoms, hydrogen atoms and a single oxygen atom forming an ether linkage with two of such carbon atoms.

EXAMPLE I

A branched chain $C_{16}$ monohydric alcohol wherein the carbinol group is positioned intermediate to the ends of the longest carbon chain was prepared by the Aldox process. This process and the range of operating conditions within which it may be carried out had previously been discussed herein. The alcohol of this example was prepared by this process employing as the olefin feed a $C_7$ olefin fraction previously prepared by a U.O.P. type polymerization of a $C_3$-$C_4$ olefin stream, cobalt and zinc catalyst in the form of their oil-soluble fatty acid salts, i.e. oleates, and under the following operating conditions.

Carbonylation reaction, $C_7$
 olefin feed rate _____ 510–530 b./d.[1]
Catalyst concentration ____ .08 wt. percent cobalt (on olefin), .02 wt. percent zinc on olefin).
Temperature, °F. _____ 350–360.
Pressure, p.s.i.g. _____ 3000–3500.
Ratio of $H_2$ to CO in synthesis gas mixture _____ 1:1.4::1.

[1] Barrels per day.

The aldehyde comprising reaction product was subjected to a conventional decobalting treatment to remove inorganic contaminants. The decobalting was carried out at temperatures averaging about 270–380° F., pressures averaging about 155–165 p.s.i.g., in the presence of water employed in a water to feed ratio of about 0.1 to 1.

The aldehyde comprising product now substantially completely free of inorganic compounds was hydrogenated by conventional methods to alcohols, i.e. at an average temperature of about 470° F. and a pressure of about 3000–3500 p.s.i.g., and subsequently fractionated to separate the aforesaid $C_{16}$ alcohol.

EXAMPLE II

A 25/75 weight percent water/alcohol was prepared by blending the $C_{16}$ alcohol of Example I with water and 0.1 weight percent based on said water, of a commercially available non-ionic emulsifying agent comprising a dinonyl phenol alkylene oxide condensate containing about 85–90 weight percent ethylene oxide per molecule.

The alcohol resin modification was tested on cotton cloth.

EXAMPLE III

Three commercially available resin formulations were chosen as representative of the resins used in "wash and wear" finishing. The chosen resins were (1) dimethylol ethylene urea-methylated methylol melamine, hereinafter referred to as a DMEU-melamine and marketed as Resloom E–50—Resloom M–80; (2) dimethylol ethylene urea-acrylic, hereinafter referred to as DMEU-acrylic and marketed as Rhonite R–1—Rhoplex B–15; and dimethylol ethylene urea-polyvinyl alcohol, hereinafter referred to as DMEU-PVA and marketed as Zeset "S"-Evanol 72–51.

The alcohol used in this test was the $C_{16}$ alcohol of Example I. This was mixed in a 9/1 alcohol/emulsifier weight ratio with an emulsifying agent comprising an ethylene oxide condensate of a $C_{13}$ aliphatic alcohol containing about 65 to 75 weight percent ethylene oxide marketed as Sterox AJ.

The test fabric used was a standard A.A.T.C.C. (American Association of Textile Chemists and Colorists) test fabric, a 36 in., 80 x 80, 4-ounce/yard mercerized cotton print cloth.

The treating mixtures were prepared to deposit 8.0 weight percent resin solids on the fabric. An aqueous emulsion of the resin was prepared by conventional techniques well known to the art. A 3/1 solids ratio was used for both the DMEU-melamine and DMEU-acrylic resin combinations. For the DMEU-PVA blend, a 3.5/1 solids ratio was used.

The alcohol-emulsifier mixture was padded on the fabric along with the resin blend to deposit 2.0 by weight of the alcohol on the fabric.

A three-roll Butterworth padder was used for padding the treating mixtures on the fabric. The gauge pressure on the rolls was set for approximately 60 p.s.i. Each fabric sample was dipped separately in the treating bath three times and, between each dip, passed through the padder with a single nip.

The treatment resulted in approximately 75% wet pickup. The percentage of wet pickup is obtained by weighing the dry untreated fabric, weighing the "wet" treated fabric after it has passed through the padder to remove excess solution; subtracting the "dry" weight from the "wet" weight and dividing the difference by the "dry" weight.

The fabric samples were placed on pin frames with tension in the warp and filling directions to give the original dimensions. Two samples were attached to each frame with an air space of at least ¼ in. between fabric surfaces. The framed fabric samples were dried in an electric circulated air oven at 160° F. for 10 minutes. The temperature was then raised and the samples were cured at 300° F. for 7 minutes using a commercially available organic amine catalyst.

Residual acids formed during curing were neutralized by immediately immersing the fabrics in a 0.1 weight percent soda ash solution at 160° F. for approximately 15 minutes. The neutralized fabrics were then air dried and prepared for testing. Other samples prepared in the same manner but without the alcohol addition were used as controls, along with untreated samples. For a further comparison other samples were treated using a commercially available silicone type softener in place of the alcohol.

The test fabrics were subjected to 20 launderings to evaluate the effectiveness and durability of the alcohol as a finishing additive for resin treatments. The fabrics were laundered in a home type washer and dried in a home type drier to simulate home laundering conditions. A household detergent, ¼ cup All, was added to the machine before it was started. The machine was operated a full cycle for each laundering, i.e. 1 wash cycle and 3 rinse cycles. Temperature measurements were taken at the beginning of each wash cycle and during the second and third rinse cycle. The temperature of the wash water was approximately 160° F., and that of the rinse water was approximately 119° F. After each laundering cycle, the fabric samples were transferred to the drier and dried adequately for storing.

Evaluations were made before laundering and after 5 and 20 laundering cycles with regard to percent of tensile strength retained. All physical tests were conducted under ASTM (American Standard Testing Materials) standard test conditions, i.e. 70° F. and 65% relative humidity, on fabrics which had been conditioned at least 24 hours.

The results of the tensile strength tests are set forth in Table I.

Table I

EFFECT OF FIVE AND TWENTY LAUNDERINGS ON COTTON PRINT CLOTH TREATED WOTH ALCOHOL-RESIN FORMULATIONS

| Treatment | Total Resin on Fabrics, Wt. Percent | $C_{16}$ "Oxo" Alcohol on Fabrics, Wt. Percent | Silicone Softener | Percent Tensile Strength Retained[a] | | |
|---|---|---|---|---|---|---|
| | | | | Before L, W+F[b] | After 5L, W+F[b] | After 20L, W+F[b] |
| 1. Untreated | 0.0 | 0.0 | 0.0 | 100.0 | 89.7 | 86.2 |
| 2. DMEU-Melamine | 8.0 | 0.0 | 0.0 | 52.3 | 40.0 | 49.8 |
| 3. DMEU-Melamine | 8.0 | 2.0 | 0.0 | 53.8 | 43.1 | 52.6 |
| 4. DMEU-Melamine | 8.0 | 0.0 | 2.0 | 47.2 | 46.2 | 43.5 |
| 5. DMEU-Acrylic | 8.0 | 0.0 | 0.0 | 45.1 | 29.7 | 39.4 |
| 6. DMEU-Acrylic | 8.0 | 2.0 | 0.0 | 57.9 | 43.1 | 49.2 |
| 7. DMEU-Acrylic | 8.0 | 0.0 | 2.0 | 39.0 | 42.1 | 42.7 |
| 8. DMEU-PVA | 8.0 | 0.0 | 0.0 | 41.0 | 33.8 | 44.4 |
| 9. DMEU-PVA | 8.0 | 2.0 | 0.0 | 47.2 | 33.8 | 48.3 |
| 10. DMEU-PVA | 8.0 | 0.0 | 2.0 | 44.2 | 44.2 | 45.0 |

[a] Based on untreated fabric.
[b] Warp plus filling.

The alcohol-resin treated fabrics also gave evidence of good tear resistance and wrinkle recovery after 20 launderings.

EXAMPLE IV

A further test was conducted as in Example III except that the catalyst employed in the resin formulation was a commercially available zinc complex catalyst, using a higher curing temperature, i.e. 350° F., and a shorter curing time, i.e. 2 minutes. In one test the amount of alcohol deposited on the fabric with the resin was 1.0% based on the weight of the fabric while in another the amount was 2.0%.

The fabrics treated with the formulations containing $C_{16}$ alcohol again showed an increase in tensile strength at the 20th laundering over that factor after 5 launderings.

EXAMPLE V

Further tests were conducted in accordance with Example I but for this difference. A two step method was used wherein the $C_{16}$ alcohol was padded on the fabric prior to application of the resin formulation.

After laundering it was found that this mode of application also resulted in good tensile strength retention and tear resistance. The wrinkle recover ability for this test actually increased slightly after 20 launderings as compared to that factor before laundering.

EXAMPLE VI

Tests are conducted exactly as in Example III except that a $C_{20}$ alcohol is employed. The alcohol is prepared as the alcohol in Example I but from a $C_9$ olefin feedstock. The tensile strength of the treated fabric is again found to be superior to the fabrics treated with resin alone and with silicone softeners.

What is claimed is:

1. An emulsion consisting essentially of 10 to 85 wt. percent of a thermosetting resin, 10 to 85 wt. percent water, 1 to 25 wt. percent of a liquid $C_{13}$ to $C_{32}$ branched chain, monohydric, aliphatic, primary alcohol and 1 to 10 wt. percent of an emulsifying agent.

2. An emulsion according to claim 1 wherein said resin comprises 65 to 85 wt. percent of said emulsion.

3. An emulsion according to claim 1 wherein said alcohol comprises 5 to 15 wt. percent of said emulsion.

4. An emulsion according to claim 1 wherein said resin is a resin selected from the group consisting of condensation products of urea and formaldehyde, condensation products of melamine and formaldehyde, condensation products of dimethylol ethylene urea, condensation products of dimethylol urea, condensation products of methylol melamine, condensation products of polyhydric alcohols and polybasic acids, and combinations of the same with each other and with acrylonitrile.

5. An emulsion in accordance with claim 1 wherein said emulsifying agent is a nonionic emulsifying agent.

6. In the process of treating a cellulose fabric with a thermosetting resin, the improvement which comprises applying to said fabric in addition to said resin a liquid $C_{13}$ to $C_{32}$ branched chain, monohydric, aliphatic, primary alcohol in the form of an aqueous emulsion and, in amounts sufficient to deposit 0.5 to 4 wt. percent of said alcohol on said fabric.

7. A process in accordance with claim 6 wherein said fabric is a cotton comprising fabric.

8. A process in accordance with claim 6 wherein said alcohol and said resin are applied to said fabric simultaneously.

9. A process in accordance with claim 6 wherein said alcohol is applied to said fabric prior to the application of said resin.

10. A process in accordance with claim 6 wherein said alcohol is applied in amounts sufficient to deposit 1 to 2.5 wt. percent of said alcohol on said fabric.

11. A cellulose fabric impregnated with a thermosetting resin and a $C_{13}$ to $C_{32}$ branched chain, monohydric, aliphatic, primary alcohol.

12. A coated fabric prepared by contacting a cotton fabric with an aqueous emulsion containing a thermosetting resin forming monomer, a liquid $C_{13}$ to $C_{32}$ branched chain, monohydric, aliphatic alcohol, an emulsifying agent, and a polymerization catalyst, and heating the resulting fabric to a temperature in the range of 280° to 350° F. for a period of 1 to 10 minutes.

References Cited in the file of this patent

UNITED STATES PATENTS

| | | |
|---|---|---|
| 2,426,770 | Grim | Sept. 2, 1947 |
| 2,729,577 | Bacon et al. | Jan. 3, 1956 |
| 2,765,287 | Aycock | Oct. 2, 1956 |
| 2,876,207 | Henderson | Mar. 3, 1959 |